US009657522B2

(12) United States Patent
Cortner et al.

(10) Patent No.: US 9,657,522 B2
(45) Date of Patent: May 23, 2017

(54) METHODS OF BENEFICIATING DRILLING FLUIDS COMPRISING LOW- AND HIGH-QUALITY CLAYS

(71) Applicant: Halliburton Energy Services, Inc., Houston, TX (US)

(72) Inventors: Thomas S. Cortner, Houston, TX (US); Charles R. Landis, Houston, TX (US); Eric B. Frantz, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 828 days.

(21) Appl. No.: 13/853,357

(22) Filed: Mar. 29, 2013

(65) Prior Publication Data

US 2014/0291028 A1 Oct. 2, 2014

(51) Int. Cl.
*E21B 7/00* (2006.01)
*C09K 8/24* (2006.01)

(52) U.S. Cl.
CPC . *E21B 7/00* (2013.01); *C09K 8/24* (2013.01)

(58) Field of Classification Search
CPC ..... C09K 2208/12; C09K 8/608; C09K 8/558
USPC ........................................................ 175/65
See application file for complete search history.

(56) References Cited

U.S. PATENT DOCUMENTS

| | | | |
|---|---|---|---|
| 3,985,659 A | 10/1976 | Felicetta et al. | |
| 4,087,365 A | 5/1978 | Clem | |
| 4,128,528 A | 12/1978 | Frisque | |
| 4,561,985 A | 12/1985 | Glass, Jr. | |
| 4,631,137 A | 12/1986 | Dymond | |
| 4,888,120 A | 12/1989 | Mueller et al. | |
| 5,380,706 A | 1/1995 | Himes et al. | |
| 5,426,079 A * | 6/1995 | Hughes | B01J 20/12 501/149 |
| 5,716,910 A | 2/1998 | Totten et al. | |
| 6,156,708 A | 12/2000 | Brookey et al. | |
| 6,462,096 B1 | 10/2002 | Dino et al. | |
| 6,777,377 B2 | 8/2004 | Myers et al. | |
| 6,914,081 B2 | 7/2005 | Hoy | |
| 8,389,447 B2 * | 3/2013 | Dino | C01B 33/44 166/305.1 |
| 2003/0104949 A1 * | 6/2003 | Myers | C04B 40/0633 507/100 |
| 2008/0203332 A1 | 8/2008 | McStay et al. | |
| 2011/0315335 A1 | 12/2011 | Landis et al. | |
| 2012/0091364 A1 | 4/2012 | McStay et al. | |
| 2012/0288649 A1 | 11/2012 | Blackwood | |
| 2014/0291029 A1 | 10/2014 | Cortner et al. | |

FOREIGN PATENT DOCUMENTS

| | | |
|---|---|---|
| CA | 2898887 A1 | 10/2014 |
| GB | 2174402 A | 11/1986 |
| GB | 2405467 A | 3/2005 |
| WO | 0060023 A2 | 10/2000 |
| WO | 2011152952 A1 | 12/2011 |
| WO | 2014160558 A1 | 10/2014 |
| WO | 2014160559 A1 | 10/2014 |

OTHER PUBLICATIONS

Technical Data, American Colloid Company, "Polargel® CA," 2001.
Technical Data, American Colloid Company, "Volclay® HPM-75," 2001.
Technical Data, American Colloid Company, "Polargel®," 2001.
Technical Data, American Colloid Company, "Bentobrite® 770," 2001.
Technical Data, American Colloid Company, "Bentobrite® KB-325," 2001.
International Search Report and Written Opinion for PCT/US2014/031024 dated Jul. 10, 2014.
Official Action for Australian Patent Application No. 2014241704 dated Sep. 28, 2015.
Coating and Encapsulation Processes in Powder Technology, Chapter 7, Sect. 3.2 Dry Coating, p. 330, Chemical Engineering Department, Compiegne University of Technology, 2007.
Murray, Haydn II, Traditional and New Applications for Kaolin, Smectite, and Palygorskite: A General Overview, Applied Clay Science, 2000, vol. 17, No. 5, pp. 207-221.
Office Action received in corresponding CA Application No. 2,898,884, dated Aug. 10, 2016.
Supplementary European Search Report received in corresponding EP Application No. 14775977, dated Aug. 26, 2016.
McStay, D. et al., An Optical Sensor for the Detection of Leaks from Subsea Pipelines and Risers, Journal of Physics: Conference Series, 2007, vol. 76, p. 012009.
Official Action for European Patent Application No. 2013309234 dated Sep. 25, 2015.

* cited by examiner

*Primary Examiner* — Angela M DiTrani
*Assistant Examiner* — Ashish Varma
(74) *Attorney, Agent, or Firm* — McDermott Will Emery LLP

(57) ABSTRACT

Beneficiating drilling fluids that comprise low-quality clay and high-quality clay may be performed by adding a polymer and a high-quality clay to a fluid that comprises an aqueous base fluid and a low-quality clay, so as to yield a drilling fluid, wherein the ratio of the low-quality clay to the high-quality clay is about 90:10 to about 80:20.

15 Claims, No Drawings

METHODS OF BENEFICIATING DRILLING FLUIDS COMPRISING LOW- AND HIGH-QUALITY CLAYS

BACKGROUND

The present invention relates to methods of beneficiating drilling fluids that comprise low-quality clay and high-quality clay.

Swellable clays, also referred to herein as clays, are a major component of aqueous-based drilling fluids. Swellable clays provide several functions including lubricating and cooling the drill bit, viscosifying the fluid, controlling fluid loss by forming a filter cake along the wellbore, and suspending drilled solids. There are several types of clays (e.g., bentonite, kaolin, and Fuller's earth) that have varying levels of performance in each of these functions. Further, within an individual type of clay the performance in each of these functions can vary based on the source of the clay, e.g., Wyoming bentonite versus Arkansas bentonite.

In some instances, the quality of the clay may be enhanced (i.e., beneficiated) through extrusion methods, aging methods, and the like. Extrusion involves mechanically shearing the clay through a grinder (similar to a meat grinder), which is expensive and sensitive to conditions like moisture levels, feed rate, and die size. Further, there are no easily identified qualities of the original clay that allow for predicting the extent of the quality enhancement or if quality enhancement will occur.

Aging involves exposing the clay to sun for several months, which sounds straightforward, but given the volumes, e.g., 80,000 ton piles, mixing the clay to provide evenly aged clay is energy intensive and may yield variable results. Further, the cost and space of inventorying clay can be high and requires predictive business modeling to have clay at the right level of aging when needed. Because of these drawbacks, the current methods for beneficiating low-quality clay are used sparingly. As such, drilling fluids use higher concentrations of low-quality clay, which increases costs and decreases the carrying capacity of the drilling fluid (e.g., the amount of cuttings that can be removed from the wellbore during drilling).

SUMMARY OF THE INVENTION

The present invention relates to methods of beneficiating drilling fluids that comprise low-quality clay and high-quality clay.

One embodiment of the present invention provides for a method that includes adding a polymer and a high-quality clay to a fluid that comprises an aqueous base fluid and a low-quality clay, so as to yield a drilling fluid, wherein the ratio of the low-quality clay to the high-quality clay is about 90:10 to about 80:20.

Another embodiment of the present invention provides for a method that includes drilling at least a portion of a wellbore with a drilling fluid, the drilling fluid formed by a production method that includes combining a fluid and a high-quality clay additive, the fluid comprising a first aqueous base fluid and a low-quality clay, the high-quality clay additive comprising a high-quality clay, a polymer, and a second aqueous base fluid, and the ratio of the low-quality clay to the high-quality clay being about 90:10 to about 80:20.

Yet another embodiment of the present invention provides for a method that includes drilling at least a portion of a wellbore with a drilling fluid, the drilling fluid formed by a production method that includes adding a polymer coated high-quality clay to a fluid comprising an aqueous base fluid and a low-quality clay, the polymer coated high-quality clay comprising a high-quality clay at least partially coated with a polymer, the high-quality clay having an $Fe^{3+}:Fe^{2+}$ ratio of about 1 or greater, the low-quality clay having an $Fe^{3+}:Fe^{2+}$ ratio of less than about 1, the high-quality clay having an average particle size less than an average particle size of the low-quality clay, and the ratio of the low-quality clay to the high-quality clay being about 90:10 to about 80:20.

The features and advantages of the present invention will be readily apparent to those skilled in the art upon a reading of the description of the preferred embodiments that follows.

DETAILED DESCRIPTION

The present invention relates to methods of beneficiating drilling fluids that comprise low-quality clay and high-quality clay.

The methods described herein for producing drilling fluids comprising an aqueous base fluid, low-quality clays, high-quality clays, and polymers may, in some embodiments, advantageously yield drilling fluids with greater performance (e.g., lubricity, viscosity, and fluid loss control) than drilling fluids comprising the same components, but are produced by other methods. Surprisingly, it has been observed that the order of addition of the aqueous base fluid, low-quality clays, high-quality clays, and polymers can have a significant impact of the rheological properties of drilling fluids.

Current methods and formulations can use at most about 30% to about 40% low-quality clay by weight of the total clay and still achieve the desired rheological properties in the drilling fluid. Additional low-quality clay reduces the rheological properties in the drilling fluid below the desired levels. In contrast, when produced by the methods described herein, the rheological properties of the drilling fluid may achieve desired levels with the unexpectedly high concentration of low-quality clays, e.g., about 80%-90% by weight of the total clay. Such beneficiation may allow for reduction in the total amount of clay used, which, in turn, reduces material costs and transportation costs.

It should be noted that when "about" is provided herein at the beginning of a numerical list, "about" modifies each number of the numerical list. It should be noted that in some numerical listings of ranges, some lower limits listed may be greater than some upper limits listed. One skilled in the art will recognize that the selected subset will require the selection of an upper limit in excess of the selected lower limit.

A measure of a clay's viscosifying efficacy is barrel yield. As used herein, the term "barrel yield" refers to the number of oil field barrels (42 gallons) that would be produced with a ton of clay hydrated with deionized water so as to achieve an apparent viscosity of 15 cP. Low barrel yield clays require more clay to produce a barrel of treatment fluid than higher barrel yield clays. As used herein, the term "low-quality clay" refers to a clay characterized as having less than 180-barrel yield. As used herein, the term "high-quality clay" refers to a clay characterized as having 180-barrel yield or greater. It should be noted that 180-barrel yield is a total solids concentration of about 11 pounds per barrel. Therefore, high-quality clays are clays that achieve an apparent viscosity of 15 cP at a concentration of 11 pounds per barrel or less in water. It should also be noted that barrel yield is a characteristic of the clay and refers to a measurement of the clay in water and not the whole drilling fluid, the clay and a polymer in water, or the like.

In some embodiments, low-quality clays may have a clay fraction that has a $Fe^{3+}:Fe^{2+}$ ratio of less than about 1. As used herein, the term "clay fraction" refers to the clay portion of a composition and can be extracted as the <325-mesh fraction of a wet sieve separation. Examples of low-quality clays may include, but are not limited to, attapulgite, sepiolite, vermiculite, illite, muscovite, biotite, Fuller's earth, kaolinite, cookeite, bulk clay, halloysite, flint clay, montmorillonite, bentonite, and the like, and any combination thereof.

In some embodiments, high-quality clays may have a clay fraction that has a $Fe^{3+}:Fe^{2+}$ ratio of about 1 or greater. Examples of high-quality clays may include, but are not limited to, hectorite, montmorillonite, bentonite, and the like, and any combination thereof.

As illustrated in the examples of low-quality clays and high-quality clays, some clay minerals may have samples that can be low-quality or high-quality depending on, inter alia, the location of mining of the clay. For example, low-quality bentonite may come from Arkansas mines while high-quality bentonite may come from Wyoming mines. It should be noted that low-quality clay and high-quality clay, as described herein, are two distinct compositions even if both comprise the same mineral in general, i.e., low-quality bentonite and high-quality bentonite are different.

In some embodiments, the high-quality clays and the low-quality clays may independently have an average particle size ranging from a lower limit of about 1 micron, 5 microns, 10 microns, 20 microns, 37 microns, or 44 microns to an upper limit of about 80 microns, 60 microns, 44 microns, or 37 microns, wherein the average particle size may range from any lower limit to any upper limit and encompasses any subset therebetween. In some embodiments, the high-quality clay may be have a lower average particle size than the low-quality clay.

Polymers suitable for use in conjunction with the methods described herein may include, but are not limited to, polysaccharides, polyacrylamides, polyalkylacrylamides, polyacrylic acids, polyvinyl alcohols, polyanionic cellulose, and the like, any derivative thereof, and any combination thereof. In some instances, copolymers comprising at least one of the foregoing may be suitable. As used herein, the term "copolymer" encompasses polymers with two or more monomeric units, e.g., alternating copolymers, statistic copolymers, random copolymers, periodic copolymers, block copolymers (e.g., diblock, triblock, and so on), terpolymers, graft copolymers, branched copolymers, star polymers, and the like, or any hybrid thereof.

In some embodiments, the concentration of polymers may range from a lower limit of about 0.01%, 0.1%, or 1% by weight of the high-quality clay to an upper limit of about 5%, 4%, 3%, or 2% by weight of the high-quality clay, and wherein the concentration may range from any lower limit to any upper limit and encompasses any subset therebetween.

Examples of aqueous base fluids suitable for use in conjunction with the methods described herein may include, but are not limited to, fresh water, saltwater (e.g., water containing one or more salts dissolved therein), brine (e.g., saturated salt water), seawater, brackish water, and any combination thereof. Generally, the water may be from any source, provided that it does not contain components that might adversely affect the stability and/or performance of the drilling fluids described herein.

Some embodiments of the present invention may involve adding polymers and high-quality clay to a prehydrated, low-quality clay, wherein the ratio of the low-quality clay to the high-quality clay is about 90:10 to about 80:20. Generally, prehydrated, low-quality clays are low-quality clays suspended in an aqueous fluid for a time sufficient to substantially hydrate the clay, i.e., where the yield point of the low-quality clays suspended in an aqueous fluid is stable, typically about 10 minutes.

In some embodiments, the polymer and high-quality clay may be added to the prehydrated, low-quality clay individually (e.g., together or in any sequence) or as a polymer coated high-quality clay. Generally, polymer coated high-quality clays comprise high-quality clays at least partially coated with a polymer. As used herein, the term "coating," and the like, does not imply any particular degree of coating on a particulate. In particular, the terms "coat" or "coating" do not imply 100% coverage by the coating on a particulate. In some preferred embodiments, the polymer may be added to the prehydrated, low-quality clay before the high-quality clay.

In some embodiments, polymer coated high-quality clays may be a high-quality clay having been dry- or wet-coated with a polymer in the form of a powder or similar dry form. Some embodiments may involve adding a polymer coated high-quality clay to a fluid comprising an aqueous base fluid and a low-quality clay, so as to yield a drilling fluid, wherein the ratio of the low-quality clay to the high-quality clay being about 90:10 to about 80:20. In some instances, the fluid may further comprise a second polymer (e.g., at least one of those described herein).

In some embodiments, polymer coated high-quality clays may be in the form of a high-quality clay additive comprising a high-quality clay, a polymer, and a non-aqueous base fluid. Some embodiments may involve combining a fluid and a high-quality clay additive to yield a drilling fluid, the fluid comprising an aqueous base fluid and a low-quality clay, and the high-quality clay additive comprising a high-quality clay, a polymer, and a non-aqueous base fluid, wherein the ratio of the low-quality clay to the high-quality clay being about 90:10 to about 80:20. In some instances, the fluid may further comprise a second polymer (e.g., at least one of those described herein).

Some embodiments may further comprise drilling at least a portion of a wellbore penetrating a subterranean formation with a drilling fluid described herein.

In some embodiments, the low-quality clay and high-quality clay together may be present in the drilling fluid in an amount ranging from a lower limit of about 0.1 ppg, 1 ppg, or 5 ppg to an upper limit of about 20 ppg, 15 ppg, or 10 ppg, wherein the total amount of clay may range from any lower limit to any upper limit and encompasses any subset therebetween.

In some embodiments, the drilling fluid may have a density ranging from a lower limit of about 9 lb/gal, 12 lb/gal, or 15 lb/gal to an upper limit of about 20 lb/gal, 17 lb/gal, or 15 lb/gal, wherein the density may range from any lower limit to any upper limit and encompasses any subset therebetween.

In some embodiments, the drilling fluids described herein may further comprise an additive. Examples of additives may include, but are not limited to, flocculent polymers, flocculents, salts, weighting agents, inert solids, fluid loss control agents, emulsifiers, dispersion aids, corrosion inhibitors, emulsion thinners, emulsion thickeners, viscosifying agents, gelling agents, surfactants, particulates, proppants, gravel particulates, lost circulation materials, foaming agents, gases, pH control additives, breakers, biocides, crosslinkers, stabilizers, chelating agents, scale inhibitors, gas hydrate inhibitors, mutual solvents, oxidizers, reducers, friction reducers, clay stabilizing agents, and the like, and any combination thereof. Such additives may be added at any point during forming a drilling fluid described herein. For example, additives may be included with the fluid comprising a low-quality clay and/or with the polymer coated high-quality clay.

Embodiments disclosed herein include:

A. a method that includes adding a polymer and a high-quality clay to a fluid that comprises an aqueous base fluid and a low-quality clay, so as to yield a drilling fluid, wherein the ratio of the low-quality clay to the high-quality clay is about 90:10 to about 80:20;

B. a method that includes drilling at least a portion of a wellbore with a drilling fluid, the drilling fluid formed by a production method that includes combining a fluid and a high-quality clay additive, the fluid comprising a first aqueous base fluid and a low-quality clay, the high-quality clay additive comprising a high-quality clay, a polymer, and a second aqueous base fluid, and the ratio of the low-quality clay to the high-quality clay being about 90:10 to about 80:20; and C. a method that includes drilling at least a portion of a wellbore with a drilling fluid, the drilling fluid formed by a production method that includes adding a polymer coated high-quality clay to a fluid comprising an aqueous base fluid and a low-quality clay, the polymer coated high-quality clay comprising a high-quality clay at least partially coated with a polymer, the high-quality clay having an $Fe^{3+}:Fe^{2+}$ ratio of about 1 or greater, the low-quality clay having an $Fe^{3+}:Fe^{2+}$ ratio of less than about 1, the high-quality clay having an average particle size less than an average particle size of the low-quality clay, and the ratio of the low-quality clay to the high-quality clay being about 90:10 to about 80:20.

Each of embodiments A, B, and C may have one or more of the following additional elements in any combination, unless already provided for: Element 1: the high-quality clay having an $Fe^{3+}:Fe^{2+}$ ratio of about 1 or greater; Element 2: the low-quality clay having an $Fe^{3+}:Fe^{2+}$ ratio of less than about 1; Element 3: the high-quality clay having an average particle size of about 1 micron to about 80 microns; Element 4: the high-quality clay having an average particle size less than an average particle size of the low-quality clay; Element 5: the low-quality clay and the high-quality clay together being present in the drilling fluid in a total amount ranging from about 0.1 pounds per barrel to about 20 pounds per barrel; Element 6: the drilling fluid having a density of about 9 lb/gal to about 20 lb/gal; Element 7: the polymer comprising at least one selected from the group consisting of a polysaccharide, a polyacrylamide, a polyalkylacrylamide, a polyacrylic acid, a polyvinyl alcohol, a polyanionic cellulose, any derivative thereof, a copolymer thereof, and any combination thereof; Element 8: drilling at least a portion of a wellbore with the drilling fluid; and Element 9: the high-quality clay being hectorite.

By way of non-limiting example, exemplary combinations applicable to A, B, C include: Element 1 in combination with Element 2; Elements 1 and 2 in combination with Element 3; Elements 1 and 2 in combination with Element 4; Element 3 in combination with Element 4; Element 5 in combination with any of the foregoing; Element 6 in combination with any of the foregoing; Element 7 in combination with any of the foregoing; Element 8 in combination with any of the foregoing; and Element 9 in combination with any of the foregoing.

To facilitate a better understanding of the present invention, the following examples of preferred or representative embodiments are given. In no way should the following examples be read to limit, or to define, the scope of the invention.

EXAMPLES

Example 1

A low-quality bentonite ("LQB") (Eccagel OCMA bentonite available from Heidelberg, South Africa Mine, operated by Ecca Holdings (PTY) Ltd) was tested in various combinations with a polymer (polyacrylate) and a high-quality bentonite ("HQB") (325-mesh bentonite from a Wyoming mine). Table 1 provides the composition of the four samples tested. The addition procedure indicates if the low-quality bentonite was prehydrated with an aqueous base fluid or if the components were added simultaneously to an aqueous base fluid.

TABLE 1

| Sample | LQB | Polymer | HQB | Addition Procedure |
|--------|-------|---------|------|--------------------|
| I | 10.00 | — | — | — |
| II | 9.98 | 0.02 | — | Hydrated |
| III | 9.00 | 0.02 | 0.98 | Dry |
| IV | 9.00 | 0.02 | 0.98 | Hydrated |

Rheological data, gel strength, and fluid loss data were then collected on the four samples, Table 2. The rheological data illustrates that the use of a prehydrated, low-quality clay in combination with a polymer and a high-quality bentonite synergistically work together for the highest rheological data (i.e., the 600 rpm data, the plastic viscosity ("PV"), and the yield point ("YP")) while maintaining high gel strength and high fluid loss control.

TABLE 2

| | I | II | III | IV |
|---|---|---|---|---|
| Rheological Data | | | | |
| 600 rpm | 19 | 31 | 31 | 36 |
| 300 rpm | 15 | 24 | 26 | 29 |
| 200 rpm | 13 | 20 | 24 | 25 |
| 100 rpm | 12 | 16 | 20 | 21 |
| 6 rpm | 10 | 10 | 13 | 13 |
| 3 rpm | 10 | 9 | 12 | 12 |
| PV | 4 | 7 | 5 | 7 |
| YP | 11 | 17 | 21 | 22 |
| Gel Strength | | | | |
| 10 s gel | 12 | 9 | 10 | 10 |
| 10 min gel | 30 | 12 | 12 | 12 |
| Fluid Loss | | | | |
| Filtrate | 21.0 | 20.0 | 22.0 | 21.0 |

The exemplary drilling fluids disclosed herein may directly or indirectly affect one or more components or pieces of equipment associated with the preparation, delivery, recapture, recycling, reuse, and/or disposal of the disclosed drilling fluids. For example, the disclosed drilling fluids may directly or indirectly affect one or more mixers, related mixing equipment, mud pits, storage facilities or units, fluid separators, heat exchangers, sensors, gauges, pumps, compressors, and the like used to generate, store, monitor, regulate, and/or recondition the exemplary drilling fluids. The disclosed drilling fluids may also directly or indirectly affect any transport or delivery equipment used to convey the drilling fluids to a well site or downhole such as, for example, any transport vessels, conduits, pipelines, trucks, tubulars, and/or pipes used to fluidically move the drilling fluids from one location to another, any pumps, compressors, or motors (e.g., topside or downhole) used to drive the drilling fluids into motion, any valves or related joints used to regulate the pressure or flow rate of the drilling fluids, and any sensors (i.e., pressure and temperature), gauges, and/or combinations thereof, and the like. The disclosed drilling fluids may also directly or indirectly affect the various downhole equipment and tools that may come into contact with the chemicals/fluids such as, but not limited to, drill string, coiled tubing, drill pipe, drill collars, mud motors, downhole motors and/or pumps, floats, MWD/LWD tools and related telemetry equipment, drill bits (including roller cone, PDC, natural diamond, hole openers, reamers, and coring bits), sensors or distributed sensors, downhole heat exchangers, valves and corresponding actuation devices, tool seals, packers and other wellbore isolation devices or components, and the like.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present invention. The invention illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

The invention claimed is:
1. A method comprising:
hydrating a second clay having an $Fe^{3+}:Fe^{2+}$ ratio of less than 1 in an aqueous base fluid to form a fluid;
adding a polymer and a first clay having an $Fe^{3+}:Fe^{2+}$ ratio of 1 or greater to the fluid, so as to yield a drilling fluid, wherein the ratio of the second clay to the first clay is about 90:10 to about 80:20; and
drilling at least a portion of a wellbore with the drilling fluid.

2. The method of claim 1, wherein the polymer is a coating on the first clay.

3. The method of claim 1, wherein first clay has an average particle size of about 1 micron to about 80 microns.

4. The method of claim 1, wherein the first clay is hectorite.

5. The method of claim 1, wherein the first clay has an average particle size less than an average particle size of the second clay.

6. The method of claim 1, wherein the second clay and the first clay together are present in the drilling fluid in a total amount ranging from about 0.3 kg/m³ (0.1 pounds per barrel) to about 57 kg/m³ (20 pounds per barrel).

7. The method of claim 1, wherein the drilling fluid has a density of about 1 kg/L (9 lb/gal) to about 2.4 kg/L (20 lb/gal).

8. The method of claim 1, wherein the polymer comprises at least one selected from the group consisting of a polysaccharide, a polyacrylamide, a polyalkylacrylamide, a polyacrylic acid, a polyvinyl alcohol, a polyanionic cellulose, any derivative thereof, a copolymer thereof, and any combination thereof.

9. A method comprising:
providing a drilling fluid formed by a production method comprising:
combining a fluid and a first clay additive, the fluid comprising a first aqueous base fluid and a second clay having an $Fe^{3+}:Fe^{2+}$ ratio of less than 1 and having been prehydrated by the aqueous base fluid prior to addition of the first clay additive, the first clay additive comprising a first clay having an $Fe^{3+}:Fe^{2+}$ ratio of 1 or greater, a polymer, and a second aqueous base fluid, and the ratio of the second clay to the first clay being about 90:10 to about 80:20; and
drilling at least a portion of a wellbore with the drilling fluid.

10. The method of claim 9, wherein the first clay has an average particle size of about 1 micron to about 80 microns.

11. The method of claim 9, wherein the first clay has an average particle size less than an average particle size of the second clay.

12. The method of claim 9, wherein the second clay and the first clay together are present in the drilling fluid in a total amount ranging from about 0.3 kg/m³ (0.1 pounds per barrel) to about 57 kg/m³ (20 pounds per barrel).

13. The method of claim 9, wherein the drilling fluid has a density of about 1 kg/L (9 lb/gal) to about 2.4 kg/L (20 lb/gal).

14. The method of claim 9, wherein the polymer comprises at least one selected from the group consisting of a polysaccharide, a polyacrylamide, a polyalkylacrylamide, a polyacrylic acid, a polyvinyl alcohol, a polyanionic cellulose, any derivative thereof, a copolymer thereof, and any combination thereof.

15. A method comprising:
providing a drilling fluid formed by a production method comprising:

adding a polymer coated first clay having an $Fe^{3+}:Fe^{2+}$ ratio of 1 or greater to a fluid comprising an aqueous base fluid and a second clay having an $Fe^{3+}:Fe^{2+}$ ratio of less than 1 and having been prehydrated by the aqueous base fluid prior to addition of the first clay additive, the polymer coated first clay comprising a first clay at least partially coated with a polymer, first clay having an average particle size less than an average particle size of the second clay, and the ratio of the second clay to the first clay being about 90:10 to about 80:20; and drilling at least a portion of a wellbore with the drilling fluid.

\* \* \* \* \*